Nov. 25, 1924.
S. SNYDER
EXTENSIBLE CRANK ELEMENT
Filed Feb. 18, 1924
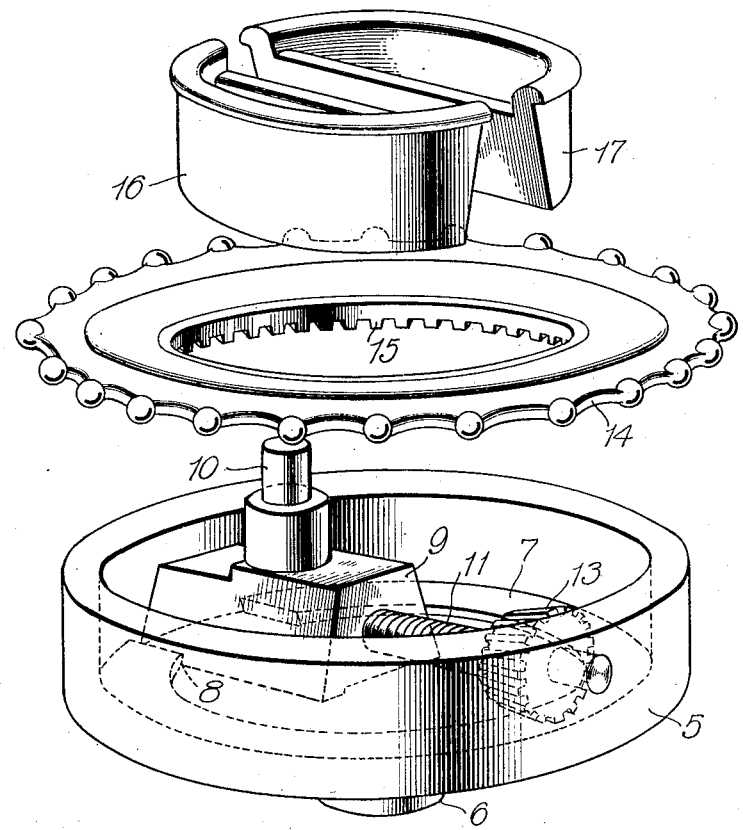
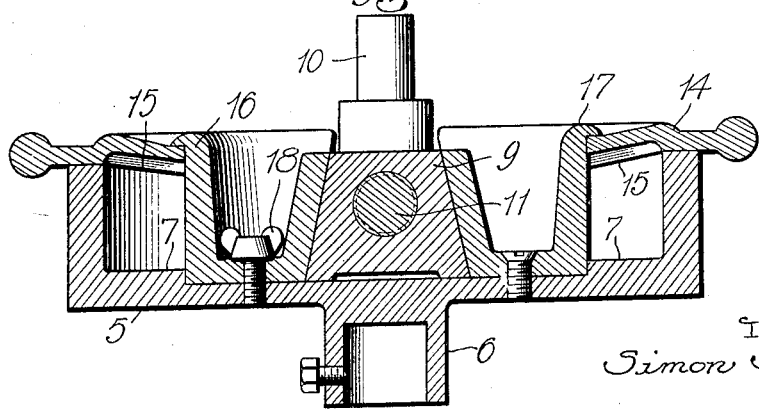
Inventor
Simon Snyder
By Dowell & Dowell
his Attorneys Nov. 25, 1924.  
S. SNYDER  
1,516,993  
EXTENSIBLE CRANK ELEMENT  
Filed Feb. 18, 1924    2 Sheets-Sheet 2

Inventor  
Simon Snyder  
By Dowell & Dowell  
his Attorneys

Patented Nov. 25, 1924.

1,516,993

UNITED STATES PATENT OFFICE.

SIMON SNYDER, OF MUNCY, PENNSYLVANIA.

EXTENSIBLE-CRANK ELEMENT.

Application filed February 18, 1924. Serial No. 693,664.

*To all whom it may concern:*

Be it known that I, SIMON SNYDER, a citizen of the United States, residing at Muncy, in the county of Lycoming and State of Pennsylvania, have invented certain new and useful Improvements in Extensible-Crank Elements; and I do hereby declare the following to be a full, clear, and exact description of the invention, such as will enable others skilled in the art to which it appertains to make and use the same.

This invention relates to machine elements and more particularly to variable eccentrics or extensible cranks used in connection with milling machinery or other mechanisms for which it may be desired to increase or decrease the reciprocal thrust or stroke of a pitman.

The principal object of the invention is to provide an extensible crank element of novel and simplified construction, which may be readily adjusted to effect a desired pitman stroke without interrupting the operation of the mechanism with which it is associated.

Another object is to provide a device of the character referred to, which will be durable, convenient and efficient in use and inexpensive in manufacture.

The invention will be first hereinafter more particularly described with reference to the accompanying drawings which are to be taken as a part of this specification, and then pointed out in the claims at the end of the description.

In said drawings, Fig. 1 is a perspective view of the disassembled device, showing the assembly relation of its several parts, some of which are partially indicated by dotted lines;

Fig. 3 is a diametrical sectional elevation taken on the line 3—3 of Fig. 2; and, Fig. 4 is a diametrical sectional elevation taken on the line 4—4 of Fig. 2.

Figures 2, 4:
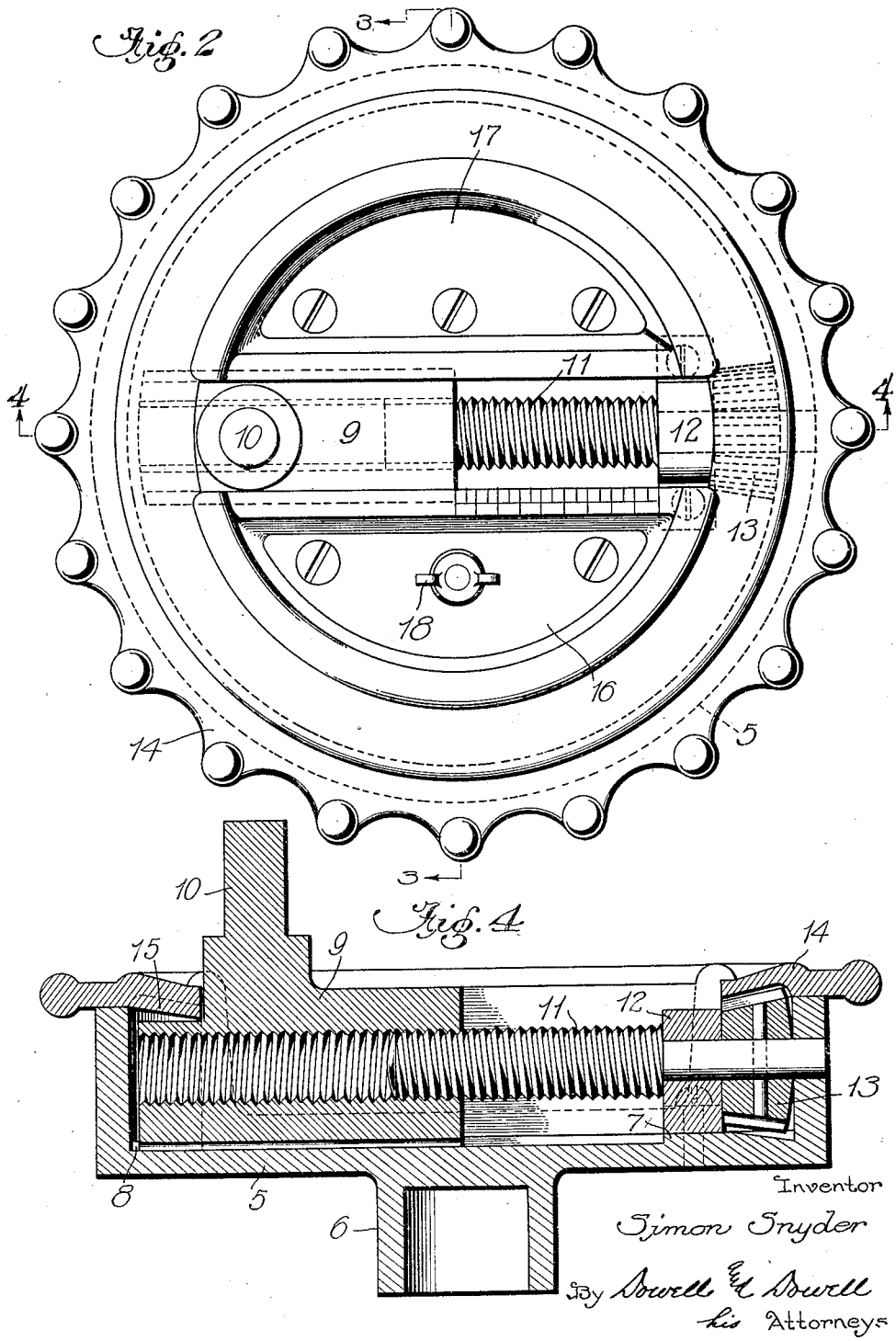
Fig. 2 is a plan view of the assembled device, parts of which are partially indicated by dotted lines.

Referring to the drawings in which like reference numerals are used to designate corresponding parts throughout the several views, 5 denotes a main or basic circular plate formed on one side with an axial shaft hub 6 and on its other side with a relatively deep annular central depression or recess and a central shallow counter-bore or recess of smaller dimension, providing a comparatively narrow slightly raised surface 7 between its bottom and circumferential edge.

A tapering recess or dove-tailed groove 8 is formed radially through a portion of the raised annular surface 7 above mentioned, within which one end of a diametrically movable block 9 of trapezoidal or frusto-pyramidal form is adapted slidably to fit, said block being provided with a shouldered crank-pin 10 projecting outwardly at substantially right angles therefrom, and formed with an interiorly threaded longitudinal bore adapted to receive the enlarged correspondingly threaded end or shank of an anchored shaft 11, said shaft being intermediately supported or journaled in a fixed bearing or block 12 with its opposite end extended into a receptive hole provided through the periphery of the plate 5.

A beveled gear or pinion 13 is removably secured or keyed to the shaft 11 between the inner wall of the plate 5 and the journal block 12, said pinion being thus adapted, when rotated, to cause revolution of said shaft in either direction. It will be understood that when shaft 11 is revolved, the block 9 will be caused to move diametrically of the plate 5 with its crank-pin 10 either toward or away from the axis of said plate and the shaft upon which it is mounted, depending of course upon the direction in which the shaft is revolved.

A peripherally notched or knobbed ring-plate 14 is adapted to rest over the recessed plate 5, the outer annular surface of the former being preferably inclined downwardly toward its axis, and its inner annular surface being formed or provided with an annular continuous rack portion 15 with which the beveled pinion 13 is adapted to engage throughout its entire extent.

Segmental top plates 16 and 17 formed with receding or beveled confronting edges or surfaces engaging snugly against opposing sides of the frusto-pyramidal block 9 and with peripherally rounded flanges overlapping the central edge of the ring-plate 14, are adapted cooperatively to fit within the annular opening through the latter and hold the same in position against the main plate with said block freely movable therebetween.

Holes are preferably provided in each of said top plates through which removable fastening screws or bolts may be extended in threaded engagement with underlying corresponding threaded orifices in the main plate for securing the several parts together as a unit. A clamp-screw or bolt 18 adapted to threaded engagement with corresponding holes through the main plate and one of the top plates, is also provided for the purpose of clamping or frictionally binding the two parts together with a pressure sufficient to prevent relative rotation of the ring plate 14 over the main plate 5.

Graduation marks corresponding with the edge of the adjacent movable block 9, or with an indicative mark thereon, are also provided along the edge of one of the top plates for convenience in determining the radial extension of the crank-pin 10 from the axis of the main plate or the shaft upon which the plate is mounted.

The operation and use of my improved crank element are as follows:

The various parts of the device are assembled together in the manner above described, after which it is mounted as a unit upon the end of a driven shaft; the hub 6 being provided for such purpose. The end of a pitman may then be connected with the crank-pin 10 to render the device ready for use in actuating the same.

Should the operator of the machine or mechanism with which the device is associated desire to decrease or increase the reciprocal thrust of the pitman, he need only loosen the clamp-bolt 18 sufficiently to relieve the pressure upon the respective plates and interruptingly grasp the peripherally knobbed plate 14 or otherwise retard the relative rotation of said plate with respect to the plate 5, whereupon the rack portion 15 of the former, with which the pinion 13 engages, will cause said pinion to rotate thereover as the plate 5 continues rotation with its shaft, thereby imparting revolution to the threaded shaft 11 and drawing the block 9 with its crank-pin 10 toward the axis of the main plate and its driven shaft, or extending the same radially therefrom, depending upon the direction in which the main plate revolves with respect to said ring-plate. In the form shown, the block 9 will be drawn inwardly with its crank-pin toward the axis of the main plate when the latter is rotated in a counter-clockwise direction with respect to the ring plate, and will be drawn in the opposite direction when the main plate is rotated in a relatively clock-wise direction.

After the block 9 has been drawn with its crank-pin in a position where the latter will describe a circle of the desired radius as the main plate is rotated with its shaft, the operator merely retightens the clamp-bolt to bind the parts in fixed position. It may here be noted that operations of the mechanism need not be interrupted in order to effect desired adjustments of the extensible crank-pin. With such purpose in view, the clamp bolt 18 may be screwed into place from the opposite side of the assembled device, or inserted from the positions shown in Figs. 2 and 3 of the drawings.

Since various changes may be made in the details and arrangement of parts without departing from the spirit and scope of my invention, I do not desire to be limited by the appended claims to the specific structure hereinbefore illustrated and described.

Having thus described my invention, what I claim as new and desire to secure by Letters Patent of the United States is:

1. An extensible crank element comprising an annular recessed and counter-recessed plate providing an intermediate annular raised surface in its base and having a radially disposed groove therein and a hub for mounting on the end of a shaft, a crank-carrying slidable block disposed within said groove diametrically of said plate and a second recessed plate having a continuous rack portion opposed to said first named plate, a revoluble shaft having threaded engagement with said block, adapted when revolved to move the latter in alternate directions and a pinion carried on said shaft in engagement with said rack portion and rotated thereby to impart revolution to the shaft and cause movement of the block diametrically of the plates when the latter are rotated in relatively opposite directions, together with opposed segmental plates adapted to hold the second named plate in fixed position with respect to the first.

2. An extensible crank element comprising an annular recessed and counter-recessed plate providing an intermediate annular raised surface in its base and having a radially disposed groove therein, a crank-arm disposed diametrically within said plate with one end slidably fitted in said groove, a second annular recessed plate resting upon said first-named plate having an annular continuous rack portion opposed thereto, a revoluble shaft having engagement with said crank-arm adapted when revolved to move the latter in alternate directions, a pinion carried on said shaft in engagement with said rack portion and rotated thereby to move the crank-arm diametrically of the plates when the latter are rotated in relatively opposite directions, together with opposed segmental plates secured to said first named plate, between which the crank-arm is movable.

3. An extensible crank element comprising an annular recessed and counter-recessed plate providing an intermediate annular raised surface in its base and having a radially disposed groove therein, a crank-arm disposed diametrically within said plate with one end slidably fitted in said groove, a second annular recessed plate resting upon said first-named plate having an annular continuous rack portion opposed thereto, a revoluble shaft having threaded engagement with said crank-arm adapted when revolved to move the latter in alternate directions, a pinion carried on said shaft in engagement with said rack portion and rotated thereby to move the crank-arm diametrically of the plates when the latter are rotated in relatively opposite directions, together with segmental plates securable to said first-named plate with the second-named plate therebetween to frictionally hold the several parts in fixed relation.

4. An extensible crank element comprising separable plates, one of said plates being recessed and counter-recessed to provide an annular raised surface between its top edge and bottom, said surface having a radially disposed groove therein, a crank carrying block disposed diametrically within said plate with one end slidably fitted in said groove, an intermediate plate having a continuous rack portion opposed to said recessed plate, a revoluble shaft having engagement with said block and adapted, when revolved, to move the latter with its crank toward or away from the axis of the plates, a journal for said shaft and a pinion carried on the end of the shaft in engagement with the rack portion of the intermediate plate and rotated thereby to move the block diametrically of the plates when the latter are rotated in relatively opposite directions, together with segmental plates overlapping said intermediate plates and securable to the first-named plate adapted frictionally to hold the parts in fixed relation.

5. An extensible crank element comprising separable annular plates, one of said plates being recessed to receive the other plate and having an annular raised surface between its top edge and bottom, a radially disposed groove formed in said raised surface, a crank-arm disposed diametrically of the plate with one end slidably fitted in said groove, an intermediate peripherally knobbed plate having a continuous rack portion opposed to said recessed plate, a revoluble shaft having threaded engagement with said crank-arm adapted when rotated to cause retraction or extension of the latter toward or away from the axis of the plate, a pinion carried on said shaft in engagement with the rack portion of the intermediate plate and rotated thereby to move the crank-arm diametrically of the plates when one of the latter is rotated with respect to the other, a journal by which said shaft is supported, together with flanged segmental plates overlapping said intermediate plate and securable to the first-named plate, adapted frictionally to hold the parts in fixed relation.

6. An extensible crank element comprising separable recessed plates, one of said plates having a continuous rack portion confronting another plate, a crank-carrying block disposed between the plates and movable toward or away from their common axis, a shaft having threaded engagement with said block adapted to cause movement of the latter with its crank in alternate directions, a pinion carried by said shaft in engagement with said rack portion and rotated thereby to slidably move the block toward or away from the axis of the plates when the latter are rotated in relatively opposite directions, together with segmental plates securable to the first-named plate with the second-named plate therebetween, adapted normally to frictionally hold the parts in fixed relation.

7. An extensible crank element comprising separable annular plates, one of said plates being annularly recessed and counter-recessed to provide an annular raised surface in its bottom, said surface having a radially disposed groove therethrough, a crank-carrying block disposed diametrically of said recessed plate with one end slidably fitted within said groove, a second annularly recessed plate resting upon the first-named plate and having an annular continuous rack portion opposed thereto, a revoluble anchored shaft having threaded engagement with said block and adapted when revolved to move the latter with its crank diametrically toward or away from the common axis of the respective plates, a fixed bearing in which said shaft is revolubly supported in a fixed longitudinal position, a pinion carried on said shaft in continuous engagement with the rack portion of the second-named plate and rotated thereby to effect the retraction or extension of the block with respect to the axis of the plates when the latter are rotated in relatively opposite directions, together with flanged segmental plates overlapping the central annular edge of the second-named plate and securable in the base of the first-named plate with the former therebetween, to frictionally hold the several parts in adjustable fixed relation.

In testimony whereof I affix my signature in the presence of two witnesses.

SIMON SNYDER.

Witnesses:
 NETTIE CUNEO,
 A. J. GOUMMER.